US006215089B1

(12) United States Patent
Schwankhart

(10) Patent No.: US 6,215,089 B1
(45) Date of Patent: Apr. 10, 2001

(54) PLASMA WELDING TORCH

(75) Inventor: Gerhard Schwankhart, Attnang (AT)

(73) Assignee: Inocon Technologie Gesellschaft m.b.H., Attnang-Puchheim (AT)

( * ) Notice: Subject to any disclaimer, the term of this patent is extended or adjusted under 35 U.S.C. 154(b) by 0 days.

(21) Appl. No.: 09/321,947

(22) Filed: May 28, 1999

(30) Foreign Application Priority Data

Jun. 2, 1998 (AT) .......... A-941/98
Jan. 4, 1999 (AT) .......... GM-2/99

(51) Int. Cl.[7] .......... B23K 9/00
(52) U.S. Cl. .......... 219/121.45; 219/75; 315/111.01
(58) Field of Search .......... 219/121.45, 121.48, 219/121.5, 121.51, 121.52, 75, 121.36, 121.44, 121.49; 315/111.21, 111.01; 29/603.12

(56) References Cited

U.S. PATENT DOCUMENTS

| | | | |
|---|---|---|---|
| 3,534,388 | * 10/1970 | Takakiyo Ito et al. | 219/121.51 |
| 3,644,782 | * 2/1972 | Sheer et al. | 315/111.21 |
| 3,900,762 | * 8/1975 | Sheer et al. | 315/111.01 |
| 3,950,629 | * 4/1976 | Auzary et al. | 219/75 |
| 4,118,618 | * 10/1978 | Gauthier et al. | 219/121.58 |
| 4,291,217 | * 9/1981 | Braun | 219/121.44 |
| 4,389,559 | * 6/1983 | Rotolico et al. | 219/121.5 |
| 4,594,496 | * 6/1986 | Bebber et al. | 219/121.5 |
| 4,692,584 | * 9/1987 | Caneer, Jr. | 29/603.12 |
| 5,340,961 | * 8/1994 | Bebber et al. | 219/121.5 |
| 5,473,132 | * 12/1995 | Sperling | 219/75 |
| 5,892,199 | * 4/1999 | Ahmed et al. | 219/137 R |

* cited by examiner

*Primary Examiner*—Teresa Walberg
*Assistant Examiner*—Quang Van
(74) *Attorney, Agent, or Firm*—Collard & Roe, P.C.

(57) ABSTRACT

A plasma welding torch comprises a non-consumable electrode arranged in a chamber provided in the torch and having a free flat end face extending substantially perpendicularly to a longitudinal axis of the electrode and having a diameter of 15% to 35% of the maximum diameter of the electrode. An inlet port leads to the chamber for delivering a plasma gas thereto, and an outlet port leads from the chamber to an orifice at an outer end of the outlet port, the outlet port having an interior wall, the electrode having a free tapering end section reaching at least to the outer end of the outlet port, and the interior wall of the outlet port being spaced from, and surrounding, the free tapering end section of the electrode and extending to the orifice substantially parallel to the tapering end section of the electrode.

4 Claims, 3 Drawing Sheets

PLASMA WELDING TORCH

The invention relates to a plasma welding torch.

In known such welding torches the outlet port which extends in the zone of the tapering section of the electrode is provided with a cylindrical zone which is immediately adjacent to the chamber and which is followed downstream by a tapering section extending up to the orifice. The interior wall of the tapering section of the outlet port, however, is provided with a cone angle which is considerably larger than that of the conical end of the electrode.

Despite the convergence of the plasma jet by the geometry of the outlet port and the electrode, a very considerable divergence of the plasma jet and thus a relatively large arc spot is observed on the workpiece to be machined in such known welding torches. This leads to a mostly undesirable increase of the zone of the workpiece which is subjected to the heat, and frequently leads to warping of the same, particularly when relatively thin sheet-metal parts are to be processed.

The large arc spot also causes a high thermal stress on the plasma torch, which as a result of the high temperatures must be cooled respectively well. As this can be brought about already at relatively small outputs of the plasma torch only with water flowing through cooling ports, respectively unwieldy designs are obtained for the plasma welding torch. This leads to the disadvantage, however, that it is not possible to work on workpieces that have a more complex shape, and it is particularly not possible to work at locations where T-seams are to be produced, and that it is already necessary to take into account the welding with such plasma torches in the design of the workpiece.

As a result of the formed larged arc spot, it is also necessary to work with conventional plasma welding torches from a very small distance from the workpieces, thus increasing the stress on the torch and subjecting it to high wear and tear.

A further disadvantage of known plasma torches is also that as a result of the very high thermal stress on the plasma torch it is not possible to have high outputs and the torches can therefore only be operated with not more than approx. 100 A. At higher strengths of current the plasma arc begins to burn between the electrode and the wall of the chamber of the outlet port of the plasma torch and from its free face side in the zone of the outlet port to the workpiece, which leads to a practically immediate destruction of the plasma torch.

It is only possible to work with relatively low welding speeds of not more than 25 mm per second or 30 mm per second with the known plasma welding torches, as otherwise the plasma arc would bend too strongly and begin to jump or even disintegrate.

It is the object of the present invention to avoid this disadvantage and to provide a plasma welding torch of the kind mentioned above which is also suitable for higher outputs and is characterized by a high service life.

This is achieved in accordance with the invention in a plasma welding torch comprising a non-consumable electrode arranged in a chamber provided in the torch and having a free flat end face extending substantially perpendicularly to a longitudinal axis of the electrode and having a diameter of 15% to 35% of the maximum diameter of the electrode. An inlet port leads to the chamber for delivering a plasma gas thereto, and an outlet port leads from the chamber to an orifice at an outer end of the outlet port. The outlet port has an interior wall, the electrode having a free tapering end section reaching at least to the outer end of the outlet port, and the interior wall of the outlet port being spaced from, and surrounding, the free tapering end section of the electrode and extending to the orifice substantially parallel to the tapering end section of the electrode.

The proposed measures ensure that the plasma gas emerging from the outlet port keeps the plasma jet of the torch together, or constricts it, outside of the outlet port. This is caused by the fact that the plasma gas emerges substantially along the envelope of a cone having a specific wall thickness and that thus turbulences are substantially avoided. This leads to a respectively small arc spot on the workpiece and to a concentration of the energy on a very small zone. This also allows guiding the plasma torch at a higher distance from the workpiece and, as a result of the higher energy density on the workpiece, also processing it with a higher rate of feed. Moreover, substantially lower wear and tear of the torch is obtained and it is also possible to work with a higher current load, e.g. with 1000 A.

Furthermore, it is also possible to omit water cooling of the welding torch which would be required in many cases, e.g. in pulsed operation as is required in overhead welding or in some types of steel, and is mandatory in conventional welding torches in such cases. The system can make do with cooling produced by the plasma gas flowing into the chamber.

The thermal stress as compared with conventional welding torches is also substantially lower when operating the welding torch in accordance with the invention with flow plasma, i.e. with a continuously flowing plasma, so that the efforts for water cooling can be reduced dramatically and the welding torches per se can thus be built with a substantially smaller size. This allows working with the welding torches in accordance with the invention at locations which formerly were inaccessible for conventional plasma welding torches as a result of their size which was caused by cooling.

The plasma gas emerging from the orifice of the outlet port ensures as a consequence of the conical shape of the gas envelope a very favourable constriction of the plasma by the ambient air despite the deceleration at its outer side, and thus ensures a very small size of the arc spot produced on the workpiece. This considerably reduces the danger of warping.

By avoiding the divergence of the plasma jet as occurs in conventional welding torches and as a result of the fact that the plasma jet does not touch the welding torch, it is possible to work with substantially higher welding speeds of 300 mm per second and more without any jumping of the plasma occurring on the workpiece. A working position of the welding torch in accordance with the invention can also be provided in which said plasma torch is inclined in the feeding direction, so that the orifice of the outlet port is leading in the feeding direction.

Moreover, the distance between the orifice of the outlet port and the workpiece, which formerly had to be set very precisely in known torches to mostly 2.5 mm to 3 mm, is uncritical in the welding torches in accordance with the invention and can also fluctuate between 2 mm and 6 mm, for example. As a result, the time consumed during the dressing and the setup of the workpieces to be welded can be reduced considerably.

To obtain a very precise guidance of the plasma gas jet, with the same accelerating towards the orifice of the outlet port as a result of the reduction of the free cross section between the electrode and the wall of the outlet port, the tapering end section may be cone-shaped, the cone angle being between 15° and 35°.

Particularly favourable conditions are obtained by the features of claim 3.

These measures moreover lead to a very stable root of the arc at the electrode in applications where the workpiece to be machined is connected to a pole of a current source, and heat can be favourably discharged from the same. This leads to only very low wear and tear of the electrode.

In a known plasma torch its electrode is held in a chamber for plasma gas, e.g. argon, helium, hydrogen, etc., and penetrates the same, with said chamber being provided with an inlet port and an outlet port which is provided on one face side of the plasma torch with an orifice and the transition from the chamber to the outlet port is disposed in the zone of the minimum distance between the electrode and a wall encompassing the same in the zone adjacent the orifice of the plasma torch. The outlet port is enclosed in sections by further ports which have a smaller diameter as compared with the outlet port, are open at the face side of the plasma torch comprising the orifice of the outlet port, and are in connection with the chamber. In the known case only two additional ports are provided whose axes extend parallel to one another and to the axis of the outlet port.

Although plasma gas can be guided into the zone of the arc spot with this known torch, there is only a rather reduced screening against the access of oxygen. Moreover, the additional ports practically contribute nothing to an improved constriction of the plasma, so that the mentioned problems in this connection are substantially maintained.

In order to achieve a very substantial protection of the workpiece heated in the zone of the arc spot against the access of air, the torch further comprises at least three further ports evenly distributed along a circumferential line concentrically surrounding the outlet port, the further ports leading from the chamber to the orifice, having a smaller cross section than the outlet port, and having axes forming generatrices of a convex surface of a cone whose axis extends coaxially to the axis of the outlet port.

This also ensures that plasma gas which emerges with a very considerable speed through the further ports cools the immediate surroundings of the arc spot and thus prevents a higher thermal stress of the workpiece and thus also any warping of the same, particularly when workpieces made of thin sheet metal are concerned. Moreover, the constriction of the plasma is improved by the proposed measures, as a result of which the arc spot can be kept particularly small, which again increases the energy density on the workpiece and allows saving energy. In addition, it is possible to work with respectively high feed speeds due to the high energy density. A relatively large depth of the weld seam is still possible.

The invention is now explained in closer detail by reference to the enclosed drawing, wherein.

Figure 4:
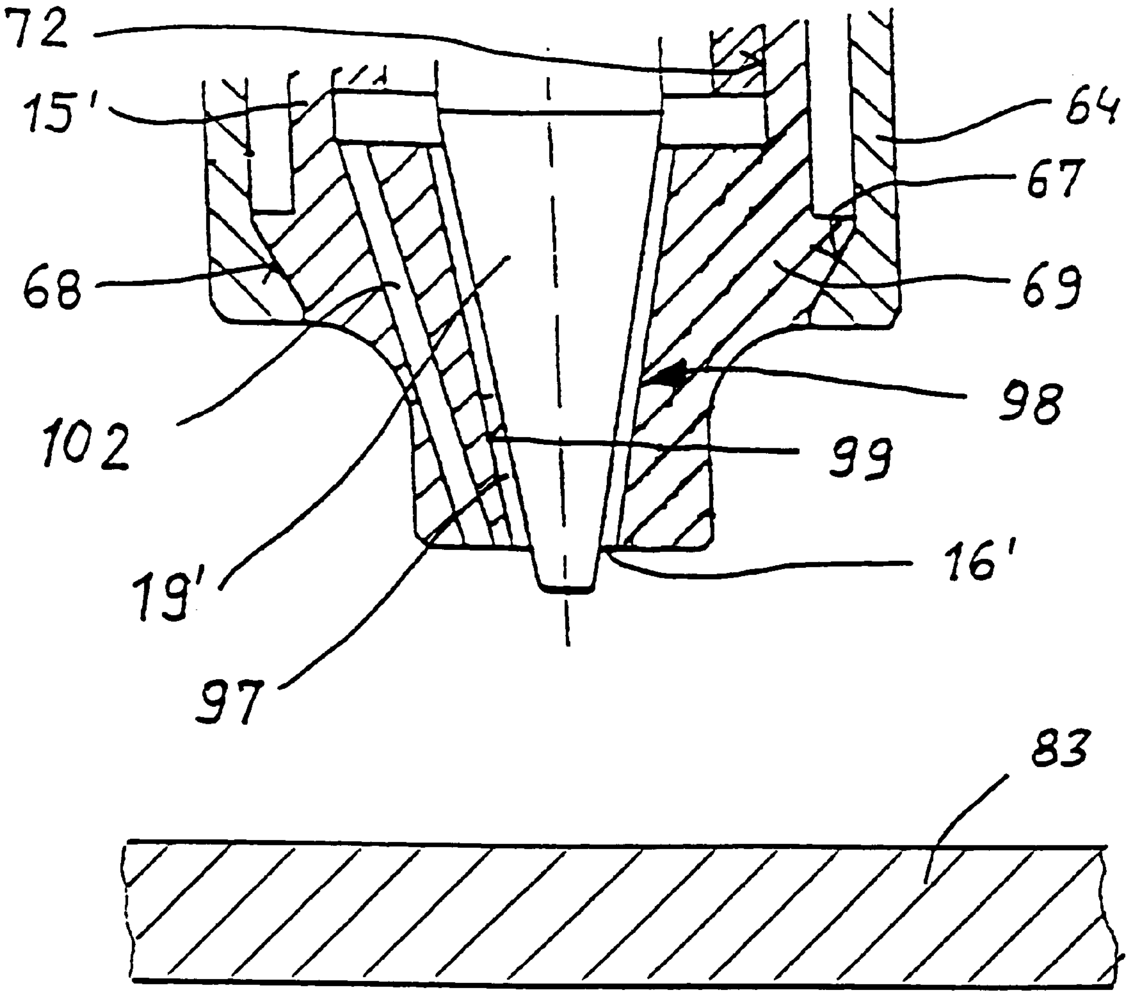

FIG. 4 schematically shows a plasma welding torch in accordance with the invention with a workpiece.

In the plasma welding torch a holding part 18' of an electrode 19' is formed by a collet chuck which is made from an electrically well-conducting material. This collet chuck is held in the usual manner in a receiver 44 which is screwed into a contact part 45.

Said contact part 45 is provided with a coolant chamber 46 which is connected with a connecting opening 48 by way of a radial port 47. Said connecting opening 48 is in alignment with the contact pins when the plasma welding torch is mounted in a holder (not shown).

An adjusting nut 49 is provided for tensioning and loosening the collet chuck 18', which nut rests on the upper face side of the receiver 44 by way of a seal 50, thus preventing any leakage of coolant. Receiver 44 also rests on the contact part 45 by way of a seal 51 in order to seal the coolant chamber 46.

For the purpose of further sealing the coolant chamber of the contact part 45, an O-ring 52 is provided which is placed in a groove of a bore 53 which is penetrated by the receiver 44.

In order to secure the axial adjustment of the electrode 19' during the tensioning of the collet chuck 18', the adjusting nut 49 is provided with a continuous threaded bore 90 into which a stop 91 is screwed which engages into the collet chuck 18'. Said stop 91 is provided with a smooth head 94 in which a circular groove has been machined for receiving an O-ring 95 which is used for sealing the interior of the collet chuck 18'.

In order to secure the position of the stop 91, which is adjustable by means of a screwdriver inserted into the face-side slot 93, a counternut 92 is provided which simultaneously ensures a torsionally rigid connection between the stop 91, on which the electrode 91' rests, and the adjusting nut 49.

As a result of the stop 19 it is ensured that during the tensioning of the collet chuck the electrode 19' can no longer be moved by the collet chuck towards an orifice part 15' which can be used for different purposes as an anode, because the adjusting nut 49 rests on the face side of the contact part 45 and the orifice part 15' is fixed with respect to the same.

The contact part 45 which is used for making the contact with the electrode 19' is inserted into an intermediate part 55 by interposing a seal 54 and rests on the same. The intermediate part 55 is made of an electrically insulating material such as ceramics. Said annular intermediate part 55 defines a chamber 27' which is connected by way of a radial port 56 with a connecting opening 57.

The radial port 56 and a further radial port 57 are provided with circular grooves 58 in which O-rings 59 are arranged. They are used for sealing the contact pin (not shown) which engages in said ports, said contact pins are hollow and are used simultaneously for the supply of cooling water or as a gas supply line for the supply of a plasma gas such as argon, helium, hydrogen, etc.

A distributor ring 159 is arranged in the chamber 27' which is provided with bores 60 which are arranged in a manner distributed over the circumference and whose diameters increase in both rotational directions with an increasing angle enclosed between said bores 60 and the radial port 56. An axial bore of the distributor ring 159 forms a chamber 96 which is penetrated by the electrode 19'. An annular space 61 remains between the inner wall of the intermediate part 55 and the distributor ring 159 in which gas can be introduced through the connecting opening 57 and the radial port 56.

The intermediate part 55 is supported by way of a seal 62 on a further contact part 63 which is used for making the contact with the orifice part 15' when it is used as an anode, e.g. when the plasma torch is used for surface hardening. A clamping sleeve 64 is screwed into an inner thread 65 in said further contact part 63, with a seal 66 being interposed between the contact part 63 and the face surface of the clamping sleeve 64.

The clamping sleeve 64 is provided in the zone of its one end with a conical bearing surface 67 on which rests a diametrically opposed conical jacket surface 68 of a head 69 of the orifice part 15' which, like the clamping sleeve 64 and the further contact part 63, is made from an electrically well-conducting material.

The orifice part 15' is provided at its end averted from the head 69 with a further head 70 which by interposing a seal 71 rests on a shoulder of the further contact part 63. The orifice part 15' penetrates a coolant chamber 46 of the further contact part 63.

The orifice part 15' is bored through in the axial direction, with a sleeve 73 made of an electrically insulating material such as ceramics being inserted in bore 72 and being penetrated by the electrode 19'. An annular chamber 96' which is part of the chamber 96 and can be flowed through by the introduced plasma gas such as argon, helium, hydrogen, etc. remains between the interior wall of the sleeve 73 and the electrode 19'.

Figure 3:
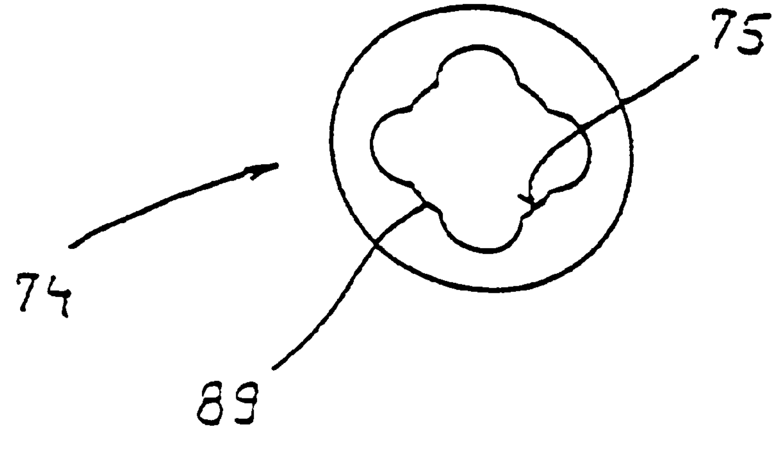
FIG. 3 shows a sectional view through the centering sleeve.

Moreover, a centering sleeve 74 is inserted in the bore 72 in the zone which is close to the orifice of the orifice part 15', which sleeve is shown in closer detail in FIG. 3 and whose guide surfaces 75, which are provided on guide ribs 89, rests on the jacket surface of the electrode 19'.

Figure 2:
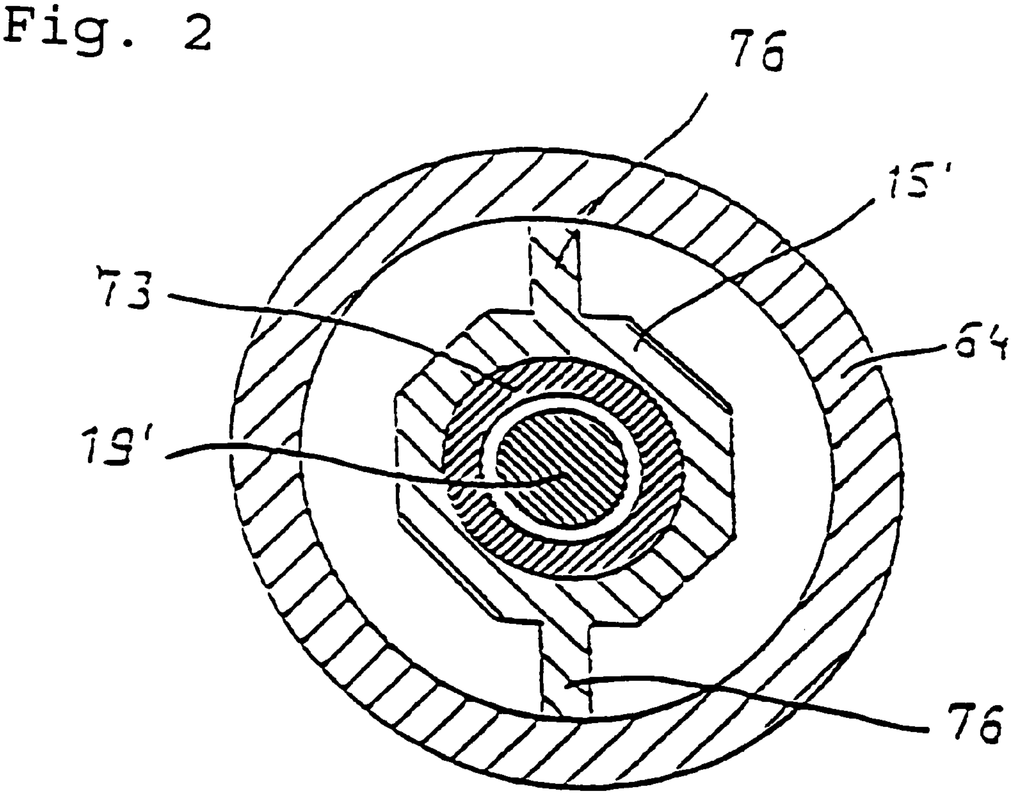
FIG. 2 shows a sectional view through the coolant chamber.

As is shown in FIG. 2, the orifice part 15' is provided with radially projecting guide ribs 76 which, as can be seen in FIG. 2, extend from the orifice part 15' having an hexagonal cross section up to the interior wall of the clamping sleeve 64 and stand perpendicular to the axis of the radial port 47. The guide ribs 76 extend away from the head 70 towards the head 69 of the orifice part 15', with said guide ribs 76 ending before head 69, however, and thus providing a flow path (not shown) between the head 69 and the end of guide ribs 76.

As a result, the coolant chamber 46', which on the one hand is limited by the further contact part 63 and the clamping sleeve 64, is subdivided by the guide ribs 76. Connecting opening 48' leads to coolant chamber 46', and a seal is provided by O-ring 59' arranged in circular groove 58'.

The two coolant chambers 46 and 46' of the contact part 45 and the further contact part 63 are mutually connected by way of a transfer port 78.

Said transfer port 78 is substantially composed of axial bores 79 and 79' in the contact part 45 and the further contact part 63, and radial bores 80 and which are coaxial to the radial ports 47, and 47' and open into the axial bores 79 and 79'. The intermediate part 55 is provided with a bore 81 which is in alignment with the axial bores 79.

Seals 82 are provided in the zone of the bore 81 of the intermediate part 55.

The two contact parts 45 and 63 are encompassed by rings 84 made of an electrically insulating material and rest on collars 85.

Figure 1:
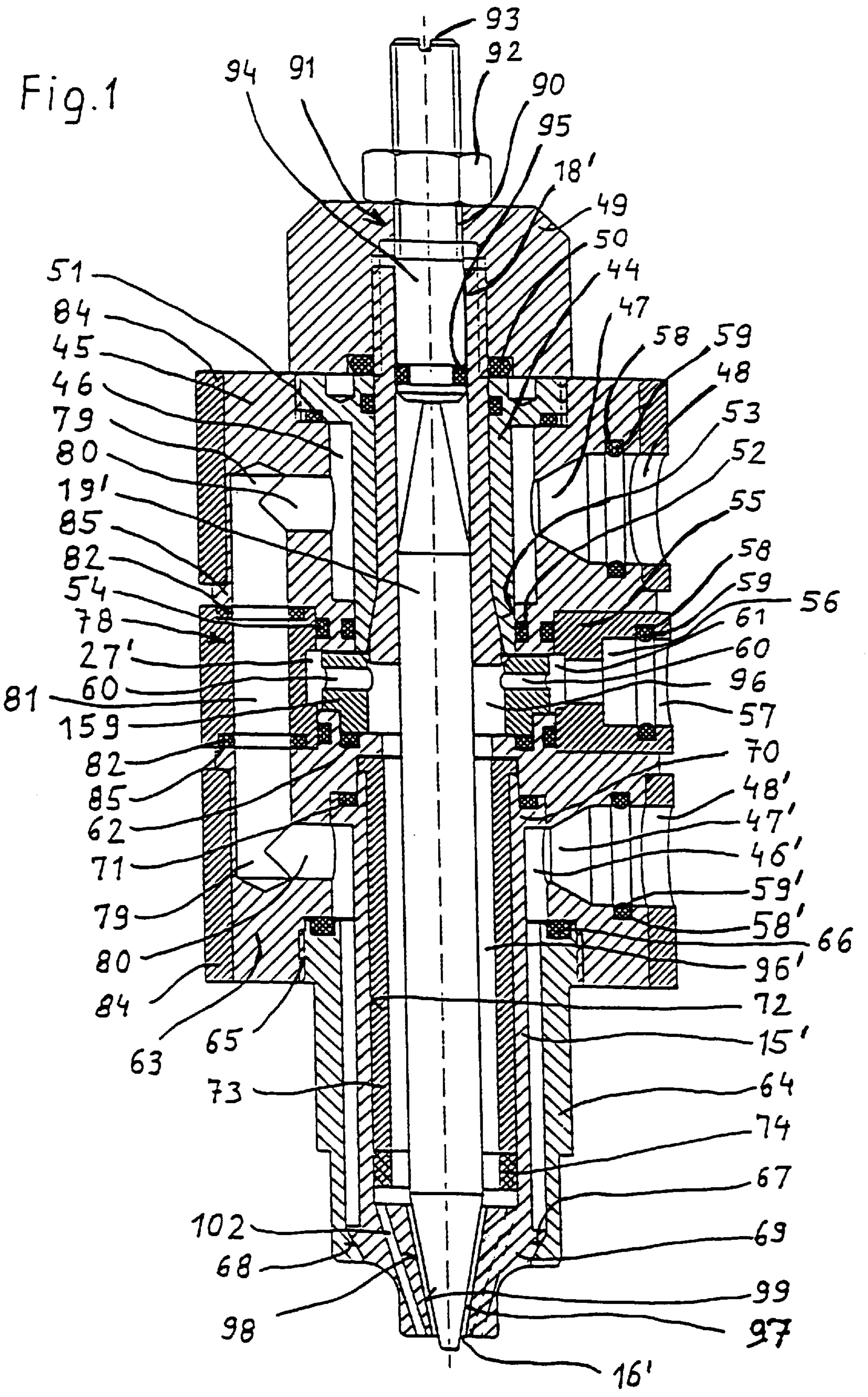
FIG. 1 shows a sectional view through a plasma welding torch in accordance with the invention.

As is shown in FIG. 1, the interior wall 99 extends substantially parallel to the conical end section of electrode 19' in the orifice zone 98 of the orifice part 15'. This leads to a conical shape of the outlet port 97 in this zone.

As is shown in particular in FIG. 4, the tip of electrode 19' is flattened off at its free end and projects from the free face side of the orifice part 15'.

The electrode 19' is arranged conically at its two ends and, if required, can be turned over after its removal and be re-inserted. Only when the electrode 19' is worn off at both of its ends it will be necessary to rework the electrode 19' in order to enable its use again.

The orifice part 15' is provided in the zone of its head 69 with at least three, peferably seven, further ports 102 which concentrically encircle the outlet port 97 having the shape of the envelope of a cone and axes of said further ports 102 form the generatrices of a convex surface of a cone whose axis extends concentrically to the axis of the outlet port 97. The cone angle of the axes of the further ports 102 is larger than the cone angle of the outlet port 97, thus leading to a common point of intersection of the axes of the further ports with the generatrices of the outlet port 97 having the shape of the envelope of a cone. Said point of intersection is preferably located 6 mm to 8 mm before the free face side of the orifice part 15'.

The additional ports 102 extend from the chamber 96' right up to the free face side of the orifice part 15' where they are open and therefore are provided with cold plasma gas in operation which thus also contributes to the cooling of the orifice zone of the orifice part 15'. This is particularly relevant when the orifice part 15' is switched as an anode and an arc burns in the zone of the outlet port 97 between the electrode 19' which is switched as a cathode and therefore plasma emerges from the orifice 16'.

The two contact parts 45 and 63 and the intermediate part 55 are mutually connected by means of screws (not shown) and represent connecting parts which ensure a modular arrangement of the plasma welding torch. This module comprises not only the orifice part 15' which can be connected as an electrode, but also the non-consumable electrode 19' including its holding part 18', as a result of which the entire plasma producer can be exchanged as a single component.

During operation a gas such as helium, argon, hydrogen or the like is blown into the chamber 27' and 96 and an arc is ignited between the electrode 19' and the workpiece 83 which, like the electrode 19', is connected to a DC power source (not shown). In conjunction with the nozzle opening 16' provided at the end of the outlet port 97, a plasma jet is formed between the tip of the electrode 19', which—as can be seen from FIG. 4—is flattened off, and the workpiece, with which two workpieces can be welded together.

Since the plasma gas emerges from the outlet port 97 in form of an envelope of a cone, this gas jet in the form of an envelope of a cone acts in a constricting manner on the plasma and guides the same. This only leads to a small arc spot on the workpiece 83 to be processed. Consequently, the thermal stress on the immediate surroundings of the weld seam to be produced remains small.

The plasma gas emerging at a high speed through the further ports 102 prevents any divergence of the plasma jet emerging from the orifice 16' as a result of the friction of the ambient air which is substantially stationary. Moreover, both the geometry of the outlet port 97 which has the shape of an envelope of a cone as well as the cold plasma gas emerging from the further ports 102 and also approximately having the shape of the envelope of a cone act in a constricting manner upon the emerging plasma jet. This leads to a very high energy density on the workpiece to be processed. As a result, a high working speed can be achieved with a relatively low input of energy and the thermal stress on the workpiece is limited to a very small area. This is particularly relevant in the processing of thin-walled workpieces or sheet metal in view of avoiding warping phenomena.

Since in the application as illustrated in FIG. 4 the arc or the plasma only burns between the flattened tip of the electrode 19' which projects from the face side of the orifice part 15' and is connected in most welding applications as a cathode, there is no direct stress on the orifice part 15' by the plasma, thus leading to a considerably lower thermal stress on this part as compared with conventional plasma welding torches where the orifice part is also used for guiding the plasma.

Moreover, the distance between the free face side of the orifice part 15' and the workpiece 83 can fluctuate within wide margins and can be chosen considerably larger as was possible in previous plasma welding torches and can be 2 mm to 6 mm for example.

What is claimed is:

1. A plasma welding torch comprising (a) a non-consumable electrode arranged in a chamber provided in the torch and having (1) a free flat end face extending substantially perpendicularly to a longitudinal axis of the electrode and having a diameter of 15% to 35% of the maximum diameter of the electrode, (b) an inlet port leading to the chamber for delivering a plasma gas thereto, (c) an outlet port leading from the chamber to an orifice at an outer end of the outlet port, the outlet port having an interior wall, (1) the electrode having a free tapering end section reaching at least to the outer end of the outlet port, and (2) the interior wall of the outlet port being spaced from, and surrounding, the free tapering end section of the electrode and extending to the orifice substantially parallel to the tapering end section of the electrode, and (d) at least three further ports evenly distributed along a circumferential line concentrically surrounding the outlet port, the further ports being open to the ambient atmosphere, leading from the chamber to the orifice, having a smaller cross section than the outlet port, and having axes forming generatrices of a convex surface of a cone whose axis extends coaxially to the axis of the outlet port, the cone and the outlet port having a common apex spaced in front of the orifice a distance of 3 mm to 8 mm.

2. The plasma welding torch of claim 1, wherein the tapering end section is cone-shaped, the cone angle being between 15° and 35°.

3. The plasma welding torch of claim 1, wherein the peak-to-valley height of the tapering end section of the electrode, of the outlet port and of the further ports does not exceed 1 $\mu$m.

4. The plasma welding torch of claim 1, comprising seven further ports.

* * * * *